United States Patent
Kobayashi

(10) Patent No.: US 11,046,197 B2
(45) Date of Patent: Jun. 29, 2021

(54) ELECTRIC VEHICLE AS POWER SUPPLYING SYSTEM

(71) Applicant: Toyota Jidosha Kabushiki Kaisha, Toyota (JP)

(72) Inventor: Jin Kobayashi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 54 days.

(21) Appl. No.: 16/530,117

(22) Filed: Aug. 2, 2019

(65) Prior Publication Data

US 2020/0130519 A1   Apr. 30, 2020

(30) Foreign Application Priority Data

Oct. 29, 2018  (JP) .............................. JP2018-202580

(51) Int. Cl.
| | |
|---|---|
| *B60L 53/16* | (2019.01) |
| *B60L 50/50* | (2019.01) |
| *B60L 53/20* | (2019.01) |
| *B60L 53/50* | (2019.01) |

(52) U.S. Cl.
CPC .............. *B60L 53/16* (2019.02); *B60L 50/50* (2019.02); *B60L 53/20* (2019.02); *B60L 53/50* (2019.02)

(58) Field of Classification Search
CPC ...................................................... B60L 53/16
USPC ....................................................... 320/109
See application file for complete search history.

(56) References Cited

U.S. PATENT DOCUMENTS

| | | | |
|---|---|---|---|
| 2012/0055724 A1* | 3/2012 | Iwasa ...................... | B60L 53/16 180/68.5 |
| 2014/0080024 A1* | 3/2014 | Igarashi ............ | H01M 8/04723 429/437 |
| 2016/0137098 A1* | 5/2016 | Katano ................... | B60L 58/40 307/10.1 |
| 2016/0185241 A1* | 6/2016 | Kinomura ............... | B60L 53/14 307/10.1 |
| 2018/0029498 A1 | 2/2018 | Taruya et al. | |

FOREIGN PATENT DOCUMENTS

| | | |
|---|---|---|
| EP | 3299211 A1 | 3/2018 |
| JP | 2013056646 A | 3/2013 |
| JP | 2018042367 A | 3/2018 |

* cited by examiner

*Primary Examiner* — Jerry D Robbins
(74) *Attorney, Agent, or Firm* — Dinsmore & Shohl LLP

(57) ABSTRACT

An electric vehicle includes a power storage device, a front compartment, a power supplying port, and an external power supplying device. The power storage device is configured to feed electric power to a motor for traveling. The front compartment is provided in front of a cabin of the electric vehicle in the electric vehicle. The power supplying port is provided in the front compartment and is configured to be connected with a power supplying cable. The external power supplying device is configured to feed electric power of the power storage device to an outside of the electric vehicle from the power supplying port.

6 Claims, 3 Drawing Sheets

ELECTRIC VEHICLE AS POWER SUPPLYING SYSTEM

CROSS REFERENCE TO RELATED APPLICATION

This application claims priority to Japanese Patent Application No. 2018-202580 filed on Oct. 29, 2018, is herein by reference in its entirety.

BACKGROUND

1. Technical Field

The present disclosure relates to an electric vehicle that includes a power storage device, an external power supplying device, and a front compartment.

2. Description of Related Art

As an electric vehicle of this kind, a vehicle is proposed in which an outlet part is provided in a cabin. The outlet part is able to externally feed electricity by using electric power of an on-vehicle battery (or example, see Japanese Unexamined Patent Application Publication No. 2013-56646 (JP 2013-56646 A)). A cable connected with the outlet part can be extended out of the cabin as the cable passes between door glass and a frame.

SUMMARY

When an outlet part (a power supplying port) is provided inside a cabin as described above, a special waterproofing measure and a crime prevention measure are necessary in order to extend out a power supplying cable from an opened door or window, and this causes increases in weight and cost.

The present disclosure provides an electric vehicle that does not require a special waterproofing measure and a crime prevention measure when a power supplying cable is connected with a power supplying port and extended outside.

An electric vehicle according to an aspect of the present disclosure has the following configuration.

The electric vehicle includes a power storage device, a front compartment, a power supplying port, and an external power supplying device. The power storage device is configured to feed electric power of a motor for traveling. The front compartment is provided in front of a cabin of the electric vehicle in the electric vehicle. The power supplying port is provided in the front compartment and configured such that a power supplying cable is connected with the power supplying port. The external power supplying device is configured to feed electric power of the power storage device to an outside of the electric vehicle from the power supplying port.

In the electric vehicle according to the aspect of the present disclosure, the power supplying port of the external power supplying device that feeds electric power of the power storage device to an outside is provided inside the front compartment that is provided in front of the cabin of the electric vehicle to the front side of the electric vehicle. In an electric vehicle in which a power supplying port is provided inside a cabin, the power supplying cable is extended to an outside of the vehicle from the power supplying port in a state where a door or a window is open. Therefore, a waterproofing measure and a crime prevention measure are necessary. However, with the electric vehicle according to the aspect of the present disclosure, since the power supplying port is provided inside the front compartment that is independent from an interior of the vehicle, a waterproofing measure and a crime prevention measure are not necessary.

The electric vehicle according to the aspect of the present disclosure may further include an impact absorption member provided inside the front compartment and configured to absorb an impact from a front side of the electric vehicle by deformation. The power supplying port may be provided behind the impact absorption member in the electric vehicle. With the electric vehicle according to this aspect, it is possible to appropriately protect a high-voltage part (the external power supplying device) from a collision from the front side of the vehicle.

Further, the electric vehicle according to the aspect of the present disclosure may further include a power control unit connected with the power storage device and the motor. The power control unit may be configured to drive the motor by using, electric power from the power storage device. The power control unit may be provided in a front portion of the electric vehicle. The external power supplying device may be connected with an electric power line that connects the power control unit and the power storage device with each other. With the electric vehicle according to this aspect, wiring from the electric power line to the power supplying port can be shortened, and it is thus possible to reduce weight and cost.

The electric vehicle according to the aspect of the present disclosure may further include a hood configured to open and close the front compartment. The power supplying port may be provided at a position below the hood in the electric vehicle and separated from the hood by a given distance. With the electric vehicle according to the aspect, when the head of a pedestrian comes into contact with the hood, it is possible to ensure a sufficient amount of deformation of the hood, and the pedestrian is thus protected.

Further, in the electric vehicle according to the aspect of the present disclosure, the power supplying port may be provided such that an outlet for the power supplying cable is directed obliquely upward and forward. With the electric vehicle according to this aspect, a user is able to have a better access to the power supplying port.

Furthermore, the electric vehicle according to the aspect of the present disclosure may further include a fuel cell stack disposed inside the front compartment. The power supplying port may be provided behind a front surface of the fuel cell stack in the electric vehicle. With the electric vehicle according to this aspect, it is possible to appropriately protect the high-voltage part from a collision from a front side of the vehicle.

Moreover, the electric vehicle according to the aspect of the present disclosure may further include a fuel cell stack disposed inside the front compartment, and a mount portion that is attached to an outer edge of the fuel cell stack and configured to fix the fuel cell stack to a vehicle body of the electric vehicle. The power supplying port may be provided behind the mount portion in the electric vehicle. Since the mount portion has high rigidity in general, it is possible to appropriately protect the high-voltage part from a collision from the front side of the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Next, a form for carrying out the present disclosure is described by using an example.

Figure 1:
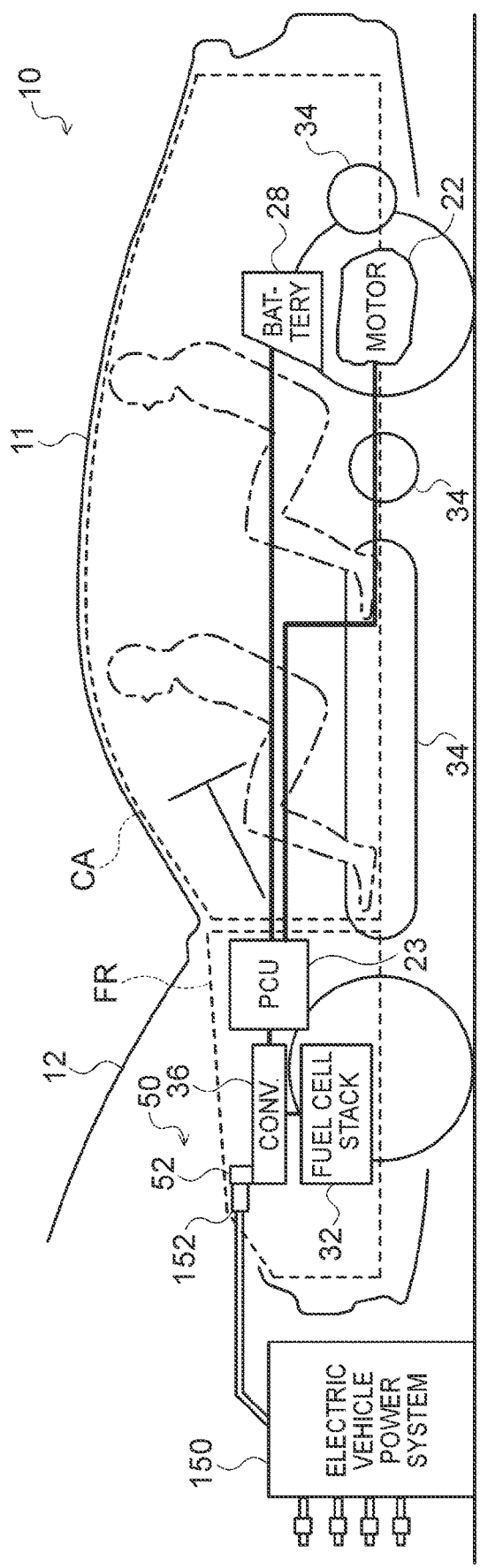
FIG. 1 is a schematic side view of an electric vehicle 10 as an example of the present disclosure.
Figure 2:
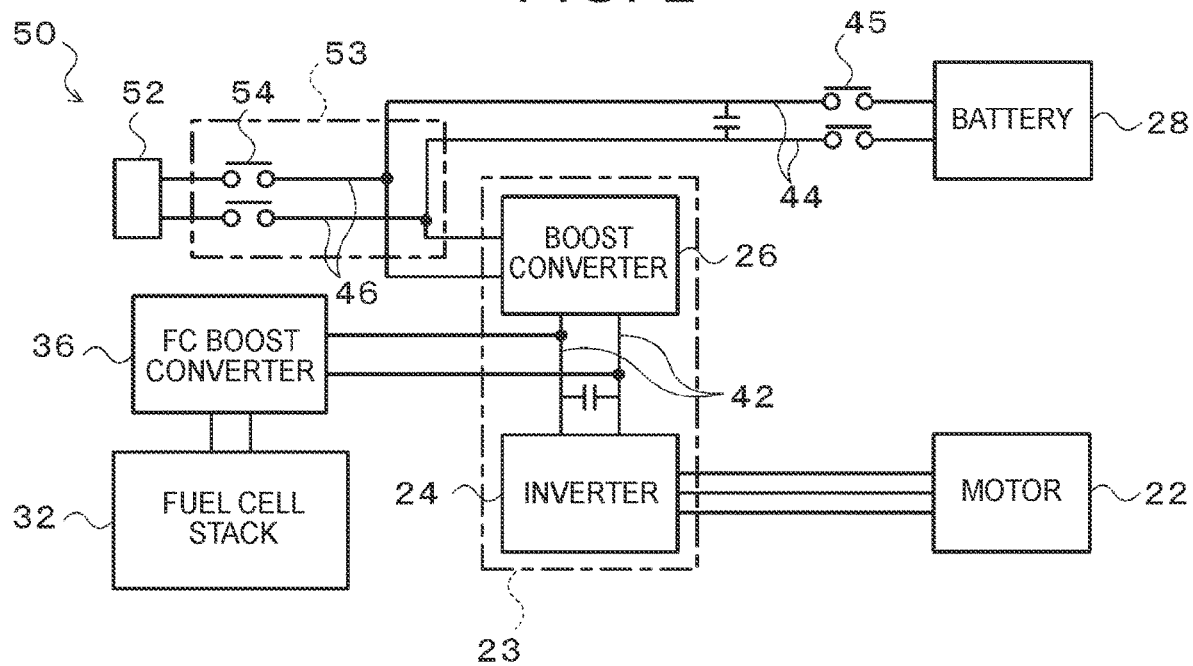
FIG. 2 is a block diagram of an electric system of the electric vehicle 10.
Figure 3:
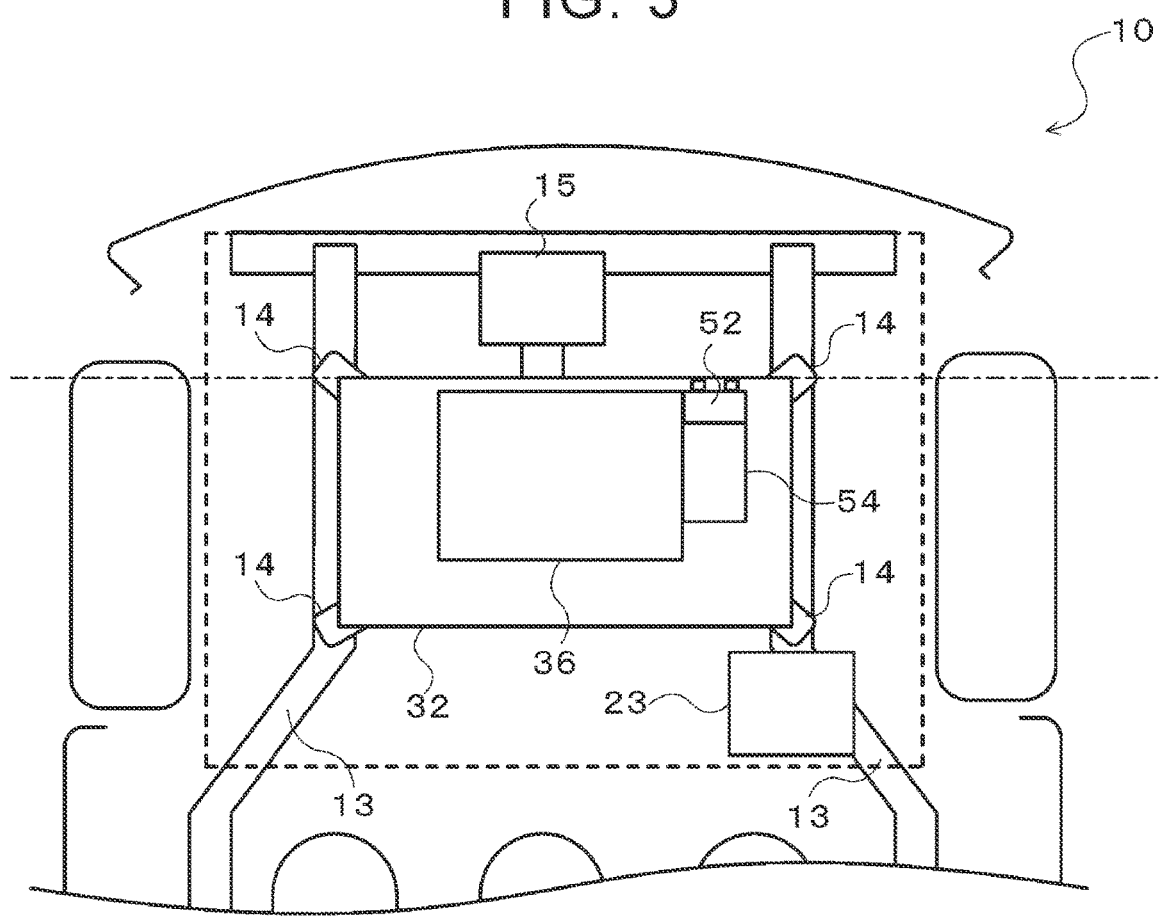
FIG. 3 is a schematic top view of a front portion of the electric vehicle 10.
Figure 4:
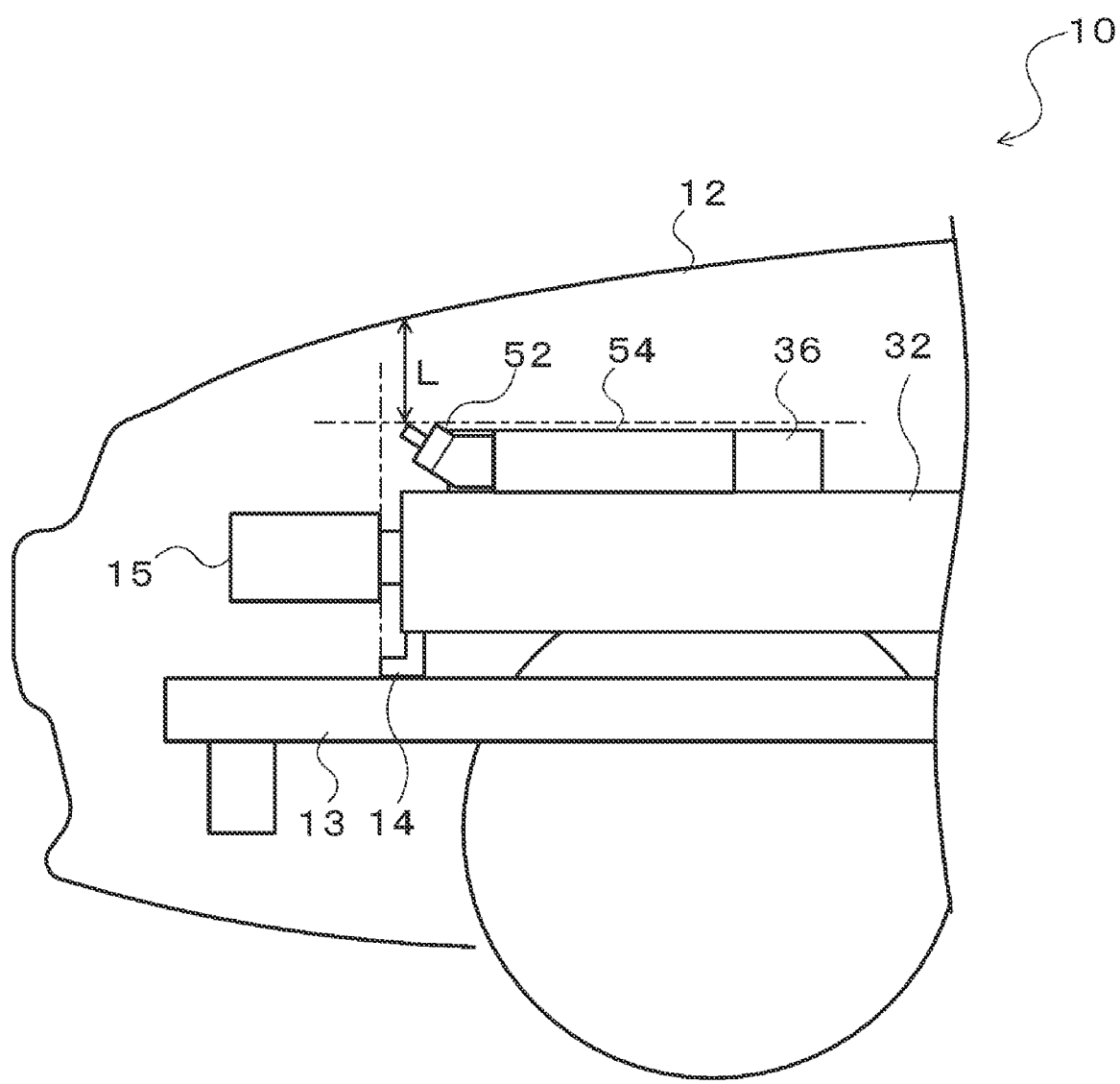
FIG. 4 is a schematic side view of the front portion of the electric vehicle 10.

FIG. 1 is a schematic side view of an electric vehicle 10 as an example of the present disclosure, and FIG. 2 is a block diagram of an electric system of the electric vehicle 10. FIG. 3 is a schematic top view of a front portion of the electric vehicle 10, and FIG. 4 is a schematic side view of the front portion, of the electric vehicle 10.

The electric vehicle 10 according to the example is constructed as a fuel cell vehicle, and, as shown in FIG. 1 and FIG. 2, the electric vehicle 10 includes a motor 22, a power control unit (hereinafter, referred to as PCU) 23, a battery 28 serving as a power storage device, a fuel cell stack 32, a hydrogen tank 34, and an external power supplying device 50.

The motor 22 is configured as a synchronous generator-motor and includes a rotor in which permanent magnets are embedded, and a stator around which a three-phase coil is wound. As shown in FIG. 1, the motor 22 is disposed in a rear portion of the electric vehicle 10 and drives rear wheels of the electric vehicle 10.

As shown in FIG. 2, the PCU 23 includes an inverter 24 and a boost converter 26. The inverter 24 is connected with the motor 22 and is also connected with high voltage-side power lines 42. The inverter 24 is configured as a known inverter circuit having six transistors and six diodes. The boost converter 26 is connected with the high voltage-side power lines 42 and low voltage-side power lines 44. The boost converter 26 is configured as a step-up step-down converter circuit having two transistors, two diodes, and a reactor. As shown in FIG. 1, the PCU 23 is disposed in a front portion of the electric vehicle 10 (in the example, inside a front compartment FR provided in front of a cabin CA of the electric vehicle 10 in the electric vehicle 10, and the cabin CA is where an occupant goes on board). The high voltage-side power lines 42 are arranged so as to connect the motor 22 disposed in the rear portion of the electric vehicle 10, and the PCU 23 (the inverter 24) disposed in the front portion of the electric vehicle 10 with each other.

The battery 28 is configured as, for example, a lithium-ion secondary battery or a nickel-hydrogen secondary battery. As shown in FIG. 1, the battery 28 is disposed in the rear portion of the electric vehicle 10 (in the example, on a back side of a rear-side seat in the cabin CA). The battery 28 is connected with the low voltage-side power lines 44. The low voltage-side power lines 44 are wired so as to connect the battery 28 disposed in the rear portion of the electric vehicle 10, and the PCU 23 (the boost converter 26) disposed in the front portion of the electric vehicle 10. Further, system main relays 45 are attached to the respective low voltage-side power lines 44.

The fuel cell stack 32 is configured as a solid polymer-type fuel cell stack. The fuel cell stack 32 is supplied with hydrogen filled in the hydrogen tank 34 and air, and generates power from electrochemical reaction between the hydrogen, and oxygen contained in the air. Output terminals of the fuel cell stack 32 are connected with the respective high voltage-side power lines 42, through an FC boost converter 36. The FC boost converter 36 is configured as a known boost converter circuit that includes two transistors, two diodes, and a reactor. As shown in FIG. 3 and FIG. 4, the fuel cell stack 32 is disposed inside the front compartment FR and fixed to frames 13 of a vehicle body 11 by respective mount portions 14 attached to four corners of an outer edge of a stack case of the fuel cell stack 32. Further, a crash box 15 is disposed in front of the fuel cell stack 32 in the electric vehicle 10. When the electric vehicle 10 has a frontal collision, the crash box 15 undergoes plastic buckling deformation in a bellows shape and absorbs impact energy so as to protect the fuel cell stack 32. The FC boost converter 36 is disposed above the fuel cell stack 32.

The external power supplying device 50 includes the power supplying port 52 and a power supplying box. A power supplying cable 152 of an electric vehicle power system 150 is connected with the power supplying port 52, and the power supplying box includes power supplying relays 54 and a fuse (not shown). The power supplying port 52 is connected with the low voltage-side power lines 44 through power supplying lines 46. As shown in FIG. 4, the power supplying port 52 is positioned below a hood 12 in the electric vehicle 10 and distanced from the hood 12 by a given distance L. Also, in the electric vehicle 10, the power supplying port 52 is disposed at a position behind a front surface of a body (the stack ease) of the fuel cell stack 32, the crash box 15 serving as an impact absorption member, and the mount portions 14 of the fuel cell stack 32 provided on the front side out of the mount portions 14 of the fuel cell stack 32. Further, the power supplying port 52 is formed so that an outlet for the power supplying cable 152 is directed obliquely upward and forward. The power supplying relays 54 are attached to the respective power supplying lines 46. As shown in FIG. 4, the power supplying box is located above the fuel cell stack 32. In this example, the power supplying box is integrated with the FC boost converter 36 in a single case.

In the electric vehicle 10 according to the example constructed as above, when a power supplying switch (not shown) provided inside the cabin is operated, the system main relays 45 and the power supplying relays 54 are turned on. Thus, a user opens the hood 12, locates the power supplying cable 152 of the electric vehicle power system 150 in the front compartment FR, and connects the power supplying cable 152 with the power supplying port 52. In the electric vehicle power system 150, direct current power from the battery 28 and direct current power generated in the fuel cell stack 32 are converted into alternating current power, and outputs the alternating current power to an electric apparatus connected with the electric vehicle power system 150. Because the power supplying port 52 is disposed so that the outlet for the power supplying cable 152 is directed obliquely upward and forward, a user is able to insert and pull out the power supplying cable 152 easily.

Here, an electric vehicle according to a comparative example is considered in which the power supplying port is provided in a cabin CA. With the electric vehicle according to the comparative example, a window or a door of the electric vehicle needs to be opened in order to place a power supplying cable 152 and connect it with the power supplying port, and this causes risks that rainwater enters the cabin CA and an article placed in the cabin CA is stolen. Therefore, with the electric vehicle according to the comparative example, a waterproofing measure and a measure against theft are necessary. On the contrary, with the electric vehicle 10 according to the example, because the power supplying port 52 is provided in the front compartment FR that is independent from the cabin CA, the waterproofing measure and the measure against theft are not necessary. Further, as the power supplying port 52 is provided in the front compartment FR, it is not necessary to provide a dedicated power supplying lid in the vehicle body 11, and it is thus possible to restrain an increase in cost.

Further, since the power supplying port 52 is disposed at a position behind the crash box 15, which is provided in front of the fuel cell stack, in the electric vehicle 10, it is possible to protect a high-voltage part (the external power supplying device 50) from a frontal collision of the electric vehicle 10. Further, since the power supplying port 52 is disposed at a position behind the mount portions 14 provided on the front side in the electric vehicle 10 out of the mount portions 14 attached to the fuel cell stack 32, it is possible to protect the high-voltage part from an oblique collision of the electric vehicle 10. Moreover, since the power supplying port 52 is disposed at a position behind the front surface of the fuel cell stack 32 in the electric vehicle 10, it is possible to protect the high-voltage part from an under-ride collision of the electric vehicle 10. As described above, it is possible to protect the high-voltage part from various forms of collisions.

Further, the power supplying port 52 is disposed below the hood 12 in the electric vehicle 10 so that the power supplying port 52 is distanced from the hood 12 by the given distance L. Therefore, when the head of a pedestrian comes into contact with the hood 12 and the hood 12 is deformed, the head of the pedestrian does not come into contact with the hard power supplying port 52 and the pedestrian is thus protected.

With the electric vehicle 10 according to the example described so far, the power supplying port 52 of the external power supplying device 50 for feeding electric power of the battery 28 to an outside is provided inside the front compartment FR that is provided in front of the cabin CA in the electric vehicle 10. With the electric vehicle in which the power supplying port is provided in the cabin CA, the power supplying cable 152 is extended from the power supplying port to an outside of the vehicle in a state where a door or a window is open. Therefore, a waterproofing measure and a crime prevention measure are necessary. However, with the electric vehicle 10 according to the example, since the power supplying port 52 is provided inside the front compartment FR that is independent from the cabin CA, the waterproofing measure and the crime prevention measure are not necessary.

In the electric vehicle 10 according to the example, the power supplying port 52 is disposed behind the crash box 15 in the vehicle. Thus, it is possible to appropriately protect the high-voltage part from the frontal collision (a head-on collision).

Further, with the electric vehicle 10 according to the example, the external power supplying device 50 is connected with the low voltage-side power lines 44 that connect the PCU 23 (the boost converter 26) and the battery 28 with each other, and the PCU 23 is provided in the front portion of the electric vehicle 10. Thus, wiring from the low voltage-side power lines 44 to the power supplying port 52 is shortened, and it is thus possible to reduce weight and cost.

Furthermore, with file electric vehicle 10 according to the example, the power supplying port 52 is provided at a position below the hood 12, which opens and closes the front compartment FR, in the electric vehicle 10 and distanced from the hood 12 by the given distance L. Thus, when the head of a pedestrian comes into contact with the hood 12 and the hood 12 is deformed, the head does not come into contact with the hard power supplying port 52. Thus, it is possible to protect the pedestrian.

Also, in the electric vehicle 10 according to the example, the power supplying port 52 is disposed so that the outlet for the power supplying cable 152 is directed obliquely upward and forward. Thus, a user is able to insert and pull out the power supplying cable 152 easily.

Also, with the electric vehicle 10 according to the example, the power supplying port 52 is disposed behind the front surface of the fuel cell stack 32, which is disposed inside the front compartment, in the electric vehicle 10. Thus it is possible to protect the high-voltage part from a frontal collision (an under-ride collision).

Moreover, with the electric vehicle 10 according to the example, the power supplying port 52 is disposed behind the mount portions 14 provided on the front side in the vehicle out of the mount portions 14 of the fuel cell stack 32. Since the mount portions 14 have high rigidity in general, it is possible to appropriately protect the high-voltage part from a frontal collision (an oblique collision).

In the example, the power supplying port 52 is disposed so that the outlet is directed obliquely upward and forward. However, the power supplying pod 52 may be disposed so that the outlet is directed right above, obliquely upward to the left, or obliquely upward to the right, depending on the position where the purer supplying port 52 is disposed.

The example describes the form of the fuel cell vehicle that travels by driving the motor 22 using electric power generated in the fuel cell stack 32. However, the form of the electric vehicle may be an electric vehicle without the fuel cell stack, or a form of a hybrid vehicle in which an engine is provided in addition to the motor 22. In this case, the power supplying port 52 of the external power supplying device 50 may be disposed at an appropriate position inside the front compartment in accordance with the form of the electric vehicle 10. In consideration with easy access to the power supplying port, it is desired that the power supplying port be disposed as frontward as possible in the electric vehicle 10 but still behind the crash box and so on in the electric vehicle 10 in order to protect the high-voltage part.

The form for carrying out the present disclosure has been described by using, the example. However, an applicable embodiment is not limited to the example whatsoever, and it is obvious that the applicable embodiment can be carried out in various forms without departing from the gist of the present disclosure.

The present disclosure is applicable to the electric vehicle manufacturing industry.

What is claimed is:
1. An electric vehicle comprising:
   a power storage device configured to feed electric power to a motor for traveling;
   a front compartment provided in front of a cabin of the electric vehicle in the electric vehicle;
   a power supplying port that is provided in the front compartment and outputs electric power from the power storage device and configured such that a power supplying cable is connected with the power supplying port;

an external power supplying device configured to feed electric power of the power storage device to an outside of the electric vehicle from the power supplying port;
a fuel cell stack disposed inside the front compartment; and
an impact absorption member provided inside the front compartment, disposed in front of the fuel cell stack and configured to absorb an impact from a front side of the electric vehicle by deformation, wherein the power supplying port is provided behind the impact absorption member in the electric vehicle.

2. The electric vehicle according to claim 1, further comprising a power control unit connected with the power storage device and the motor, wherein;
the power control unit is configured to drive the motor by using electric power from the power storage device;
the power control unit is provided in a front portion of the electric vehicle; and
the external power supplying device is connected with an electric power line that connects the power control unit and the power storage device with each other.

3. The electric vehicle according to claim 1, further comprising a hood configured to open and close the front compartment, wherein:
the power supplying port is provided at a position below the hood in the electric vehicle; and
the power supplying port is separated from the hood by a given distance.

4. The electric vehicle according to claim 1, wherein the power supplying port is provided such that an outlet for the power supplying cable is directed obliquely upward and forward.

5. The electric vehicle according to claim 1, wherein the power supplying port is provided behind a front surface of the fuel cell stack in the electric vehicle.

6. The electric vehicle according to claim 1, further comprising:
a mount portion that is attached to an outer edge of the fuel cell stack and configured to fix the fuel cell stack to a vehicle body of the electric vehicle, wherein the power supplying port is provided behind the mount portion in the electric vehicle.

* * * * *